: 2,924,539
Patented Feb. 9, 1960

2,924,539
WETTING COMPOUND FOR COLORED ALUMINUM ANODIZED SURFACES

Herbert Arndt, Chicago, and Heinz Seiler, Galesburg, Ill., assignors to Midwest Manufacturing Corporation, Galesburg, Ill., a corporation of Illinois No Drawing. Application October 26, 1956
Serial No. 618,437

1 Claim. (Cl. 117—127)

This invention relates to a process for improving the wettability and water run-off properties of anodized aluminum surfaces.

In present day refrigerators the evaporators commonly are made of anodized aluminum, having a protective hard outer surface of aluminum oxide which may be suitably colored, if desired. When water condenses on such surfaces it has a tendency to form discrete drops, rather than a continuous film which runs off readily, with consequent dripping and ice formation which detract from the proper operation of the refrigerator. Attempts have been made to treat such surfaces to improve the water run-off properties, but in time the treating material used heretofore itself is washed off by the water, leaving the evaporator surfaces poorly wettable, as before.

The present invention is directed to the treatment of anodized aluminum surfaces in such a manner as to avoid the above-mentioned disadvantages, so that the treated surfaces retain excellent water run-off properties substantially permanently.

Accordingly, it is an object of the present invention to provide a novel method of treating anodized aluminum surfaces so that water runs off them quickly.

It is also an object of this invention to provide a novel method of treating anodized aluminum surfaces so that they acquire excellent water run-off properties which are substantially permanent.

In accordance with the present invention, the foregoing objects are accomplished by treating anodized aluminum surfaces with ethylenediamine tetraacetic acid in a vehicle of water at elevated temperature for a time sufficient to achieve the desired properties.

In the following description several practical examples of the present invention are described in detail.

Example 1

180 milligrams of ethylenediamine tetraacetic acid and 1.5 millimeters of 40° Bé. sodium silicate ($Na_2SiO_3$) were added to 1 liter of water. This solution had a pH of 8.85. The solution was heated to 200–210° F. and the anodized colored aluminum surfaces were immersed in the heated solution for seven minutes. After removal from the solution, the anodized aluminum surfaces were rinsed with cold water and clean air blown over them.

Before being treated, the wetting and water run-off properties of the anodized colored aluminum were very poor. After treatment as just described, the surfaces had excellent wetting and water run-off properties. There was no fading of the color of surfaces so treated. The protective properties of the anodized coating remained satisfactory.

Further examples

Comparable results were obtained using a salt of the acid in the solution in various concentrations and with various values of solution pH.

In one embodiment, 0.5 gram of the tetrasodium salt of ethylenediamine tetraacetic acid and 2.5 cc. of 40-Bé. sodium silicate were added to 1 liter of water. The pH of this solution was about 9. The temperature of this solution was kept at 205–210° F. and the immersion time was seven minutes.

In another, 0.35 gram of the tetrasodium salt of ethylenediamine tetraacetic acid and 1 ml. of 40° Bé. sodium silicate were added to one liter of water. The solution pH was 8.86. The immersion time was seven minutes and the solution temperature was maintained at 200–210° F. during immersion.

In still another, 1.7 grams of the tetrasodium salt of ethylenediamine tetraacetic acid and 5 ml. of 40° Bé. sodium silicate were added to one liter of water. The pH of this solution was 9.15, the immersion time seven minutes, and the solution temperature 200–210° F. during immersion.

In yet another embodiment, 3.4 grams of the tetrasodium salt of ethylenediamine tetraacetic acid and 10 ml. of 40° Bé. sodium silicate were added to 1 liter of water. The pH of the solution was 9.69. The immersion time was seven minutes and the solution was kept at 200–210° F. during immersion.

In place of the sodium salt of the acid, the potassium and lithium salts might be used instead, if desired.

In each of the foregoing examples, when cold water is applied to the treated surfaces the water drops spread well and tend to form a continuous, unbroken film, indicating good wetting of the treated surfaces. The water runs smoothly off the surfaces when they are tilted. When the surface is tilted 10° from the horizontal, complete water run-off occurs quite rapidly.

While certain presently preferred embodiments of the present invention have been described hereinbefore, it is to be understood that various modifications and omissions which depart from the described embodiments may be adopted without departing from the spirit and scope of this invention.

We claim:

A method of treating an anodized aluminum surface to produce a substantially permanent wettable coating on said surface which comprises immersing said surface in a solution at a temperature substantially within the range from 200° F. to 210° F. for at least seven minutes, said solution containing a wetting agent selected from the group which consists of ethylenediamine tetraacetic acid and salts of said acid.

References Cited in the file of this patent

UNITED STATES PATENTS

| | | |
|---|---|---|
| 2,598,213 | Blair | May 27, 1952 |
| 2,680,081 | Probert | June 1, 1954 |
| 2,711,974 | Hoppe | June 28, 1955 |
| 2,767,106 | Gunderson | Oct. 16, 1956 |
| 2,776,918 | Bersworth | Jan. 8, 1957 |
| 2,788,292 | Giesker | Apr. 9, 1957 |